United States Patent Office 3,139,444
Patented June 30, 1964

3,139,444
PREPARATION OF CIS 2-(5-NITRO)-FURYL-
ACRYLIC ACID
Abelardo P. Martinez, San Jose, and Robert J. Seiwald,
San Francisco, Calif., assignors to Francis P. Filice,
Daly City, Calif.
No Drawing. Filed Mar. 14, 1960, Ser. No. 14,522
1 Claim. (Cl. 260—347.3)

This invention relates to the preparation of the cis form of 2-(5-nitro)-furylacrylic acid, and of certain of its derivatives and intermediates.

The 2-(5-nitro)-furylacrylic acid series may be represented as follows:

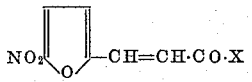

wherein X represents an hydroxyl group, an amide group, an esterifying group such as $OC_2H_5$ or $$-O-C_6H_4-O-C_2H_5$$

or OM wherein M is a salt forming entity such as sodium, potassium, ammonium or the hydrogen equivalent of a polyvalent metal such as calcium or magnesium. These compounds have protozoicidal activity as disclosed in the following copending applications:

Francis P. Filice, Serial No. 733,847, filed May 8, 1958, entitled "Compositions Having Activity as Protozoicides and Against Other Microorganisms"; and Herbert C. Prosser, Serial No. 793,276, filed February 16, 1959, entitled "Furylacrylic Acid Derivatives," both now abandoned.

As prepared heretofore, 2-(5-nitro)-furylacrylic acid and its derivatives have been prepared only in the trans form

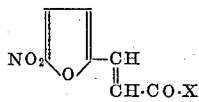

Apparently because of steric hindrance and/or for other reasons the cis form

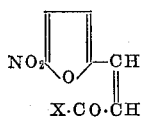

has not been prepared, even in admixture with the trans form.

It is an object of the present invention to prepare the cis form of this series of compounds. Thus there is reason to believe that the cis form has greater biological activity than the trans form. Also it is important to compare the cis and trans forms of this series of compounds to throw light on the observed differences, biologically, of different batches of the compounds. Thus a very pure, crystalline preparation may be less active as a protozoicide than a less pure preparation, and the solubility characteristics of compounds of this series are known to have a biological effect. To ascertain the differences in protozoicidal activity between the sterically different forms (i.e., the cis and trans forms) of this series of compounds, it is necessary to prepare each form in the pure state.

It is, therefore, an object of the present invention to prepare the cis form of 2-(5-nitro)furylacrylic acid and its derivatives, and to devise methods of so doing.

Liebermann, Ber., 27, 283–7 (1894) and 28, 129 (1895) has described a method of preparing the cis form of furylacrylic acid by decarboxylating furfurylidene malonic acid, thus

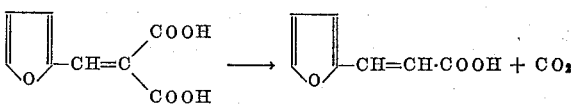

However, the method of Liebermann does not, when applied to 5-nitro furfurylidene malonic acid yield the cis isomer; it produces only the trans isomer.

We have succeeded in preparing and purifying cis 2-(5-nitro) furylacrylic acid by certain methods, one being a modification of Liebermann's method and another being by nitration of a eutectic mixture of cis and trans furylacrylic acids. We have also prepared certain novel derivatives of 2-(5-nitro) furylacrylic acid and a novel intermediate which is useful in the preparation of 2-(5-nitro) furylacrylic acid.

EXAMPLE 1.—PREPARATION OF 5-NITRO-
FURFURYLIDENE MALONIC ACID

To a 50 ml. flask was added 15.0 g. (0.106 mole) of 5-nitrofurfural, 10.0 g. (0.0962 mole) of malonic acid and 5 ml. of glacial acetic acid. The flask was stoppered with a calcium chloride tube and stirred. The solids went into solution after 4 hours and solids started to precipitate after 24 hours of stirring. The reaction was stopped at the end of 336 hours. The reaction mixture was filtered to give 12.5 g. of solid. The filtrate was cooled in ice and a second crop collected (7.5 g.). The combined crops were dissolved in water and the resulting solution cooled in ice. 0.03 g. of 5-nitrofurfural (1.5%), M.P. 33°,[1] was recovered. The aqueous filtrate was placed on a steam bath and evaporated to dryness at reduced pressure to give about 20.0 g. (87%) of 5-nitrofurfurylidene malonic acid, M.P. 194–195°.

*Analysis.*—Calculated for $C_8H_5NO_7$: C, 42.20; H, 2,21; mol. wt. 227. Found: C, 42.20; H, 2.31; mol. wt. 231 by titration.

Table I sets forth the effect of reaction time on yield:

Table 1.—*Summary of Preparation of 5-Nitro-
furfurylidene Malonic Acid*

| 5-nitrofur-fural, g. | Malonic acid, g. | Acetic acid, ml. | Time, hrs. | Yield,[a] percent |
|---|---|---|---|---|
| 5.0 | 3.50 | 5.0 | 46.2 | 74.0 |
| 6.3 | 4.42 | 9.4 | 264 | 92.7 |
| 15.0 | 10.00 | 22.0 | 336 | 98.5 |

[a] This yield is based on unreacted 5-nitrofurfural recovered.

EXAMPLE 2.—DECARBOXYLATION OF 5-NITRO-
FURFURYLIDENE MALONIC ACID TO CIS 2-
(5-NITRO)-FURYLACRYLIC ACID

To a 100 ml. flask was added 1.8 g. (0.0072 mole) of 5-nitrofurfurylidene malonic acid and 3.5 ml. of acetic anhydride. The flask was fitted with a condenser and a thermometer suspended 1 inch above the surface of the liquid. Decarboxylation started at a temperature of about 60° and heating was continued until the reflux temperature reached 95°. The reaction last 10 minutes. The reaction mixture was cooled in ice and 2 ml. of water added to quench the acetic anhydride. The two phases were neutralized with 30% sodium hydroxide to pH 6.5. A small quantity of sodium salt precipitated which when dissolved in water and neutralized with concentrated hydrochloric acid, gave about 0.1 g. of trans 2-(5-nitro)-furylacrylic acid, M.P. 235°. The filtrate was acidified with concentrated hydrochloric acid to pH 5 and the red crystalline product collected giving 0.60 g. of trans-2-(5-

[1] All temperatures herein are centigrade.

nitro)-furylacrylic acid, M.P. 232° dec. The filtrate was further acidified to pH 1, cooled in ice for 15 minutes, and the reddish crystalline product collected to give 0.5 g. (37.0%), M.P. 175–176° of cis 2-(5-nitro)-furylacrylic acid. The cis configuration was confirmed by the presence of a new absorption peak at 8.8μ in the infrared and the reduction of the trans absorption at 10.4 by about 95%.

*Analysis.*—Calculated for $C_7H_5NO_5$: C, 45.90; H, 2.72. Found: C, 46.07; H, 2.89.

In Table II is given a summary of three decarboxylations of 5-nitro-furfurylidene malonic acid. In all of these experiments the ratio of acid to acetic anhydride was 0.62.

*Table II.—Summary of Decarboxylations of 5-Nitrofurfurylidene Malonic Acid*

| 5-nitro-FMA [a] | Method of 5-nitro-FMA addition | Temp.[b] (Time[c]) | Yield |
|---|---|---|---|
| 1.8 g | To cold Ac₂O. | 95° (10 min.) | pH 6—Na-salt (trans-acid, 0.1 g., M.P.236°). pH 5—None. pH 1—0.50 g., M.P. 175–176°, cis-acid, 37.0%. |
| 2.64 g | To cold Ac₂O. | 105° (10 min.) | pH 6—Na-salt (trans-acid, 0.1 g., M.P. 236°). pH 5—0.53 g., M.P. 236°, trans-acid. pH 1—0.30 g., M.P. 175–176°, cis-acid. pH 1—0.35 g., M.P. 300°, unknown. |
| 1.0 g | To boiling Ac₂O. | 140° (5 min.) | pH 5—0.05 g., M.P. 236°, trans-acid. pH 1—0.3 g., M.P. 300°, unknown. |

[a] 5-nitrofurfurylidene malonic acid.
[b] Maximum reflux temperature.
[c] Total time since addition of 5-nitro-FMA to the end of the reaction.

EXAMPLE 3.—SYNTHESIS OF 2-(5-NITRO)-FURYLACRYLIC ACID BY NITRATING A EUTECTIC OF CIS AND TRANS FURYLACRYLIC ACIDS

To a three necked flask fitted with a stirrer and nitrogen inlet was added 31.6 ml. of acetic anhydride and 14 ml. of fuming nitric acid added drop-wise at −6.0°. A solution of 9.22 g. (0.0502 mole) of eutectic in 16.5 ml. of acetic anhydride was then added slowly to the nitrating mixture kept at −6.0°. After the conclusion of the addition, the temperature was maintained at −6.0° for an additional 1.5 hours. The precipitated trans 2-(5-nitro)-furylacrylic acid, 1.62 g. (17.5%), was collected and washed with chilled acetic anhydride. The filtrate and washings were collected in a filter flask coled in a Dry Ice-acetone bath to prevent oxidation. Ice and ether were added to the filtrate and the cold slurry extracted until the red color was discharged. The red ether extracts were combined and dried over anhydrous sodium sulfate. The ether was distilled under reduced pressure leaving a viscous red oil as a residue. The oil was neutralized with 30% sodium hydroxide to pH 8 and a small amount of precipitate removed. The filtrate was acidified to pH 5 with concentrated hydrochloric acid which precipitated 1.5 g. (16.2%) of crude trans 2-(5-nitro)-furylacrylic acid, M.P. 228° dec. The highly diluted filtrate was further acidified to a pH 1. There was no immediate precipitate, but after standing in the refrigerator for 24 hours, 2.5 g. of crude brown product was recovered, M.P. 185–210°. This was recrystallized from benzene giving an orange-yellow crystalline material, 0.5 g., M.P. 191–210°. The benzene filtrate was concentrated and a second crop of crystals obtained, 0.20 g., M.P. 176–180°. A third crop was obtained after further evaporation of the benzene solvent giving 0.10 g. (1.81%) of cis 2-(5-nitro)-furylacrylic acid, M.P. 175–176°. The infrared spectra of this compound and that prepared by decarboxylation in Example 2 were found to be identical.

EXAMPLE 4.—PREPARATION OF THE PHENETIDIDE OF CIS - 2 - (5 - NITRO) - FURYLACRYLIC ACID

This compound, having the formula

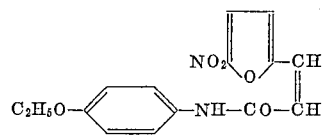

was prepared as follows:

To a large test tube fitted with a side arm and a cold finger condenser was added 0.3 g. (0.00164 mole) of cis 2-(5-nitro)-furylacrylic acid and 10 ml. of redistilled thionyl chloride. The test tube was slowly heated with a micro burner. The reaction started readily and was completed within 15 minutes. The excess thionyl chloride and volatile by-products were removed in vacuo giving needles which were not isolated. The acid chloride was dissolved in 40 ml. of dry ether. To 15 ml. of the ethereal solution containing 0.124 g. (0.00062 mole) of the acid chloride was added an excess of phenetidine. A voluminous yellow precipitate was collected which consisted predominantly of phenetidine-hydrochloride. The ether filtrate was diluted with 5 times its volume of ligroin, a small quantity of precipitated salt, M.P. 230°, removed, and the filtrate allowed to stand in the refrigerator for 24 hours. The lustrous deep red crystals of cis-N-phenetidid-2-(5-nitro)-furylacrylamide, M.P. 129.5–131°, were collected and washed with ligroin. The ultraviolet absorption spectrum is the same as that of the trans-N-phenetidid-2-(5-nitro)-furylacrylamide.

EXAMPLE 5.—PREPARATION OF CIS-2-(5-NITRO)-FURYLACRYLAMIDE

This compound, having the formula

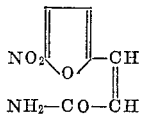

were prepared as follows:

Excess anhydrous ammonia was passed into 25 ml. of the ethereal solution containing 0.187 g. (0.00103 mole) of acid chloride. The ammonium chloride precipitate was removed and the filtrate was again saturated with anhydrous ammonia, stoppered and placed in the refrigerator. After a few hours a small amount of precipitate was removed, the filtrate diluted with 5 times its volume of ligroin and the solution evaporated to half its volume. On cooling, 0.12 g. (64.5%) of the cis-amide was collected, M.P. 131–133°. A second fraction, 0.02 g., M.P. 128–133°, brought the yield to 75.2%. The ultraviolet absorption spectrum corresponds closely to that of the trans-amide.

In decarboxylating 5-nitro-furfurylidene malonic acid (Example 2), better results (i.e., a much higher yield of the cis form of 2-(5-nitro)-furylacrylic acid) were obtained using technical rather than reagent grade acetic anhydride. Low temperatures are preferred and in the fractional precipitation by pH adjustment it is preferred that the pH not exceed about 6.0, otherwise oils will be produced.

In the direct nitration technique of Example 3, the success of the method is due to the fact that the nitrated cis and trans isomers do not form a eutectic. Generally throughout the furylacrylic acid series the cis and trans isomers form eutectics and cannot be separated by crystallization, but the nitrated cis-trans mixtures are an exception. Low temperatures are important during recovery of the nitrated mixture to prevent oxidation. Once the nitrated mixture is separated from the excess nitric acid by ether extraction it is stable, but the nitration and separation of the nitrated mixture should be completed within a few hours. In applying pH fractional precipitation to the nitrated mixture, extreme dilutions are preferably avoided to achieve optimum yields.

Cis 2-(5-nitro)-furylacrylic acid is quite stable. Recrystallization from boiling benzene does not convert it to the trans form.

The cis amide derivatives (i.e., the amide of Example 5 and the phenetidide of Example 4) have physical properties which are very different from the trans isomers. For example, the trans phenetidide precipitates quantitatively from ether together with the phenetidine-hydrochloride by-product (which results from the reaction of the acyl chloride and phenetidine) whereas only 4% of the cis form precipitates. Therefore the cis phenetidide can be separated easily by first crystallizing the trans isomer substantially quantitatively from ether and recovering the cis form from the mother liquor. This provides another method of synthesis, and separation, which consists of preparing a mixture of the cis and trans amide or phenetidide and selectively crystallizing the trans from ether.

Other derivatives of cis 2-(5-nitro)-furylacrylic acid may be prepared, for example, simple esters such as the methyl and ethyl esters; more complex aryl esters such as e.g., the 4-ethoxyphenyl ester

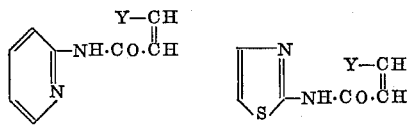

in which Y represents the 2-(5-nitro)-furyl radical; and other amides such as the 2-pyridyl and 2-thiazolyl amides,

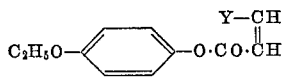

wherein Y has the same meaning. Suitable methods of preparation are described in the aforesaid copending applications, which describe methods of synthesis applied to cis-trans mixtures. The same methods are applicable to the pure cis 2-(5-nitro)-furylacrylic acid of the present invention.

It will, therefore, be apparent the cis form of 2-(5-nitro)-furylacrylic acid and several of its derivatives have been prepared, in admixture with the trans form and in in pure form free from the transisomers, such compounds being represented generally by the formula

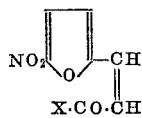

wherein X represents an hydroxyl group, the group OM (M being a salt forming atom or radical), an amide group or an ester group. Also certain novel methods of preparation have been provided, among them being: (1) Decarboxylation of 5-nitrofurfurylidene malonic acid to a mixture of cis and trans forms of 2-(5-nitro)-furylacrylic acid (or the preparation of a mixture of cis and trans forms by any other means), followed by fractional precipitation at progressively lower pH. The trans form precipitates at the higher pH's and the cis comes out at lower pH's after most of the trans form has been removed. (2) A eutectic mixture of cis and trans furylacrylic acid is nitrated and the reaction product is subjected to fractional precipitation at different pH's. As in (1), the trans form comes out preferentially at the higher pH's and the cis form comes out when the trans form has been separated and the pH is lowered. This result is possible because the nitrated cis and trans compounds do not form a eutectic mixture. (3) Amide derivatives (e.g., the amide, and the phenetidide) of cis-trans mixtures are formed and subjected to crystallizing out the trans form from ether.

Moreover certain novel intermediates have been provided, such as 5-nitrofurfurylidene malonic acid.

We claim:

The method of preparing the cis form of 2-(5-nitro)-furylacrylic acid which comprises nitrating a eutectic mixture of the cis and trans forms of furylacrylic acid and then subjecting the nitrated mixture to fractional precipitation from an aqueous solution by reducing the pH of the solution in steps to selectively precipitate the trans form at higher pH's while the cis form remains in solution.

References Cited in the file of this patent
UNITED STATES PATENTS 2,224,243 Bowen _____ Dec. 10, 1940
2,436,532 Singleton _____ Feb. 24, 1948

OTHER REFERENCES

Dutt: Chem. Absts., vol. 19 (1925), col. 2475 (abst. of Quart. J. Chem. Soc. 1, 1925).

Gillman et al.: J. Am. Chem. Soc., vol. 52 (1959), pp. 2550–4.

Dodd: J. Pharmacol. Exptl. Therap., vol. 82 (1944), p. 11.

Dunlop: "The Furans," Reinhold Pub. Co. (1953), p. 164.

Ueno: Chem. Absts., vol. 48 (1954), col. 10954 (abst. of Japanese Pat. 5,079, Oct. 5, 1953).

Fieser: Org. Chemistry, 3rd ed. (1956), pp. 278–80.

Fromm: Chem. Absts., vol. 50 (1956), col. 6730 (abst. of Acta Cient. Venezolana, 6, 1955).

Plisov et al.: Chem. Absts., vol. 50 (1956), col. 3384c (abst. of Thur. Obshchei Khim. 25, 1944–9 (1955)).